United States Patent [19]
Gould et al.

[11] Patent Number: 5,596,571
[45] Date of Patent: *Jan. 21, 1997

[54] CDMA RADIOTELEPHONE HAVING OPTIMIZED SLOTTED MODE AND LONG CODE OPERATION

[75] Inventors: Adam F. Gould; James R. Robertson, both of San Diego; John W. Noneman, Valley Center; John R. Gelm, San Diego, all of Calif.

[73] Assignee: Nokia Mobile Phones Ltd., Finland

[*] Notice: The term of this patent shall not extend beyond the expiration date of Pat. No. 5,491,718.

[21] Appl. No.: 549,975

[22] Filed: Oct. 30, 1995

Related U.S. Application Data

[63] Continuation of Ser. No. 178,401, Jan. 5, 1994, Pat. No. 5,491,718.
[51] Int. Cl.[6] .............................. H04B 1/69; H04J 13/02
[52] U.S. Cl. ....................... 370/335; 375/206; 455/127; 455/343
[58] Field of Search ........................... 375/208, 205, 375/209, 206, 210, 200; 455/54.1, 54.2, 343, 127; 370/18

[56] References Cited

U.S. PATENT DOCUMENTS

| | | | |
|---|---|---|---|
| 5,103,459 | 4/1992 | Gilhousen et al. | 375/1 |
| 5,212,808 | 5/1993 | Su et al. | 455/51.1 |
| 5,237,615 | 8/1993 | Snow. | |
| 5,247,702 | 9/1993 | Su et al. | 455/34.1 |
| 5,258,995 | 11/1993 | Su et al. | 375/1 |
| 5,263,045 | 11/1993 | Schilling | 375/200 |
| 5,267,244 | 11/1993 | Messerschmitt | 370/95.3 |
| 5,383,219 | 1/1995 | Wheatley, III et al. | 375/205 |
| 5,392,023 | 2/1995 | D'Avello et al. | 455/343 |
| 5,457,814 | 10/1995 | Myrskog et al. | 455/127 |
| 5,465,269 | 11/1995 | Schaffner et al. | 375/200 |

OTHER PUBLICATIONS

TIA/EIA Interim Standard TIA/EIA/IS–95 Jul. 1993 pp. 6–71 to 6–75.
TR45.5.2/93.02.03.02 (Feb. 3,1993) Status of TR45.5.2 Contributions as of Jan. 14, 1993.
TR45.5.2/93.01.13.10 (Jan. 13, 1993) Duty Cycle Power Consumption in Slotted Paging Mode, Adam Gould.
TR45.5.2/93.02.03.08 (Feb. 3,1993) Text Modification . . . , Adam Gould et al.
TR45.5.2/93.02.04.03 (Feb. 4, 1993) Text Modifications . . . , Adam Gould et al.

*Primary Examiner*—Hassan Kizou
*Assistant Examiner*—Kwang Yao
*Attorney, Agent, or Firm*—Perman & Green

[57] ABSTRACT

A radiotelephone (10) capable of operation within a CDMA radiotelephone system. The radiotelephone includes a receiver (30) for receiving a paging channel transmission; a system time pseudonoise (PN) generator (18); and despreading circuitry (20, 22, 24 26, 28), having an input coupled to the receiver, for despreading the paging channel transmission received during at least a portion of the assigned slot. The assigned slot is predetermined to have a duration that is three times the duration of a rollover period of the system time pseudonoise (PN) generator (26.667 msec) and four times the duration of one frame (20 msec), or 80 msec. The use of predetermined masks for initializing the PN generators, and in particular a Long Code PN generator (32), is also described.

4 Claims, 3 Drawing Sheets

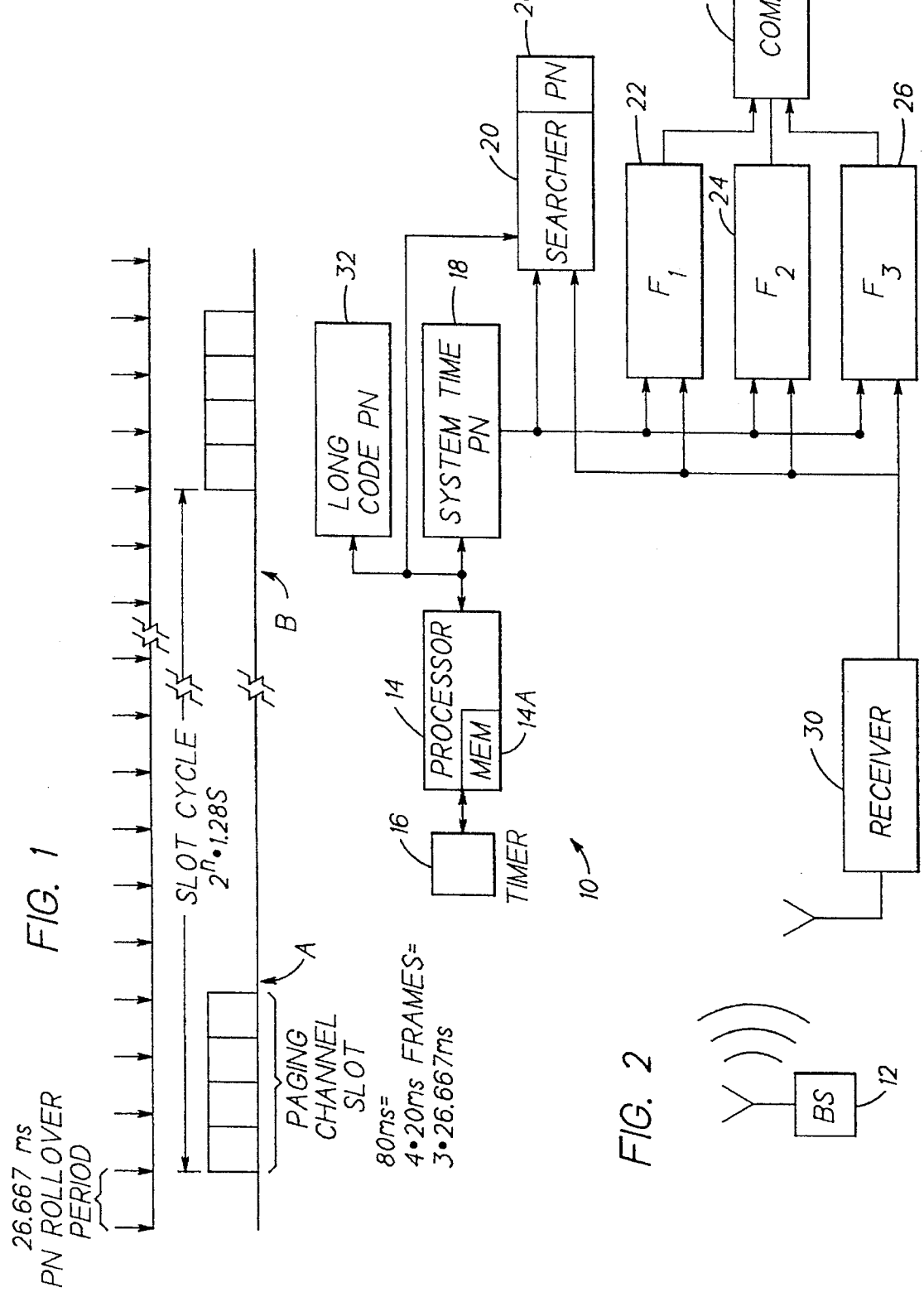

42 X 42 MATRIX

CDMA RADIOTELEPHONE HAVING OPTIMIZED SLOTTED MODE AND LONG CODE OPERATION

This is a continuation of application Ser. No. 08/178,401 filed on Jan. 5, 1994, now U.S. Pat. No. 5,491,718.

FIELD OF THE INVENTION

This invention relates generally to the operation of a radiotelephone and, in particular, to a radiotelephone that operates in accordance with a paging channel monitoring protocol.

BACKGROUND OF THE INVENTION

A pan-European digital cellular radio system which is in use in Europe (Groupe Speciale Mobile or GSM) implements a discontinuous reception (DRX), or "slotted paging mode", when operating in an idle mode. In this mode a radiotelephone, also referred to herein as a mobile station, does not continuously monitor a paging channel when in the idle mode. Instead, the radiotelephone is required to monitor the paging channel only during an assigned paging channel time slot. During all other paging channel time slots the radiotelephone can place itself into a low power mode of operation, such as by removing power from selected circuitry, thereby reducing power consumption and prolonging battery life.

A convenient method to make power consumption comparisons for the DRX mode employs the duty cycle, or the ratio of receiver on to off (sleep) time. Clearly, the lower the duty cycle the less time the radiotelephone is required to be powered on. A reduction in the on time, or conversely an increase in the off or sleep time, provides a reduction in power consumption and an increase in battery life.

In GSM, the idle mode is based on the concept of multiframes, each of which is 235 milliseconds. (ms) long. The radiotelephone is required to read one paging message every two to nine multiframes (470 ms to 2.1 seconds), as specified by the base station. In addition, each paging message consists of four frames, where a frame is 4.615 ms in duration and consists of eight timeslots, each having a duration of 0.5769 ms. A radiotelephone is only required to receive one timeslot per frame. Therefore, the radiotelephone is required to receive only one paging message, of 18.46 ms (4×4.615 ms) duration, every 470 ms to 2.1 seconds. Of this 18.46 ms, the receiver circuitry is required to be active for only 18.46/8=2.31 ms. Assuming for this example that the receiver circuitry is on for the minimum time, the duty cycle ranges from a maximum of 2.31 ms/470 ms=3.9% to a minimum of 18.46 ms/2.1 seconds=0.9%.

DRX has also been proposed to be implemented in the Japanese Digital Cellular (JDC) system. Although the U.S. digital cellular TDMA system (IS-54) does not, at present, implement a DRX mode, one is under consideration for the future, using the GSM and the proposed JDC systems as models.

In the proposed implementation of DRX in the JDC system, and similar to GSM, the concept of superframes in used. Each superframe is 720 ms in duration, and consists of 36 frames of 20 ms each. The radiotelephone is required to read one paging message per superframe. Each frame in JDC consists of three timeslots, and the radiotelephone is required to receive only one timeslot of the three. In that a paging message consists of only one timeslot, of 20 ms/3= 6.67 ms duration, the duty cycle in this proposed system is 6.67 ms/720 ms, or 0.93%.

As originally proposed for the U.S. Code Division Multiple Access (CDMA) system, the radiotelephone must periodically receive one 200 ms slot, as determined by a SLOT_CYCLE_INDEX value. The index is selected by the radiotelephone, except that the base station can set the maximum index to correspond to as small as a one second cycle time. A typical, reasonable slot cycle for a radiotelephone is two seconds. Therefore, the duty cycle could be as low as 200 ms/2 seconds=10%, and as high as 200 ms/1 second=20%. Both of these duty cycle values are clearly significantly greater than the corresponding minimum and maximum values achievable with the GSM and the proposed JDC systems.

In addition, there exists a certain amount of overhead to receive a slotted page message. Because of continuous convolutional coding on the CDMA paging channel, the radiotelephone must receive at least a frame before and after the 200 ms slot, depending on the paging channel data rate. This time, in conjunction with various turn-on times in the radiotelephone receiver, results in a typical overhead of up to 100 ms. The total on-time of the radiotelephone thus becomes approximately 300 ms, resulting in a duty cycle between 20% and 30%, depending on the slot cycle length.

Furthermore, it is possible that the radiotelephone would be required to receive two paging channel slots. This can occur if the base station uses the MORE_PAGES bit in the SLOTTED PAGE MESSAGE, thereby requiring the radiotelephone to receive up to one additional slot. Also, the CDMA specification states that the radiotelephone may stop listening to the paging channel after reading the SLOTTED PAGE MESSAGE, there is no guarantee that this message is located at the beginning of the slot. As a result, it may happen that the radiotelephone must always listen to the entire slot.

As presently specified for use, a CDMA radiotelephone includes a system time pseudonoise (PN) generator, also referred to herein as a "short code" as opposed to "long code" generator. The system time short code PN generator has a rollover period of 26.67 milliseconds, and is aligned with the frame timing (20 milliseconds) every 80 milliseconds.

Another feature of the CDMA system is the use of a Long Code for mobile unit identification. The Long Code is a PN sequence with period $2^{42}-1$ that is used for scrambling on the Forward (base station to mobile) CDMA Channel and for spreading on the Reverse (mobile to base station) CDMA Channel. The Long Code uniquely identifies a mobile station on both the Forward and Reverse Traffic Channels. The Long Code also serves to provide limited privacy, and separates multiple Access Channels on the same CDMA channel. A Long Code Mask is a 42 bit binary number that creates the unique identity of the Long Code.

A problem is created when it is desired to periodically shutoff a long code generator, such as when powering down the radiotelephone when operating in the slotted paging (DRX) mode described above, and to then restart the long code generator in the proper state when powering back up. In that the long code generator is intended to run continuously, it is essential that the long code generator be initialized to the proper state whenever it is started after a period of non-operation.

One method has been proposed which would read the state of the long code generator just prior to powering down the mobile station. A complex matrix multiply operation is then applied to the long code to determine the correct state of the long code generator at a time in the future when the long code generator is to be reinitialized.

However, this approach is computationally expensive. As a result, it may be necessary to "wake up" the radiotelephone earlier than would be necessary if the complex matrix multiply operation is performed after the power down period. If the matrix multiply is performed before powering down, then the mobile station must remain in a powered up state for a period of time sufficient to accomplish the matrix multiply. In either case, the mobile station is powered on for a longer time. The causes the overall duty cycle and power consumption to increase, thus decreasing battery life.

SUMMARY OF THE INVENTION

A first object of this invention is provide a method for reducing the duty cycle of a CDMA radiotelephone when operating in a slotted paging mode.

A further object of this invention is to provide a discontinuous reception mode of operation in a radiotelephone, wherein a duration of a transmission that must be periodically received is made an integer multiple of a system time constant and also an integer multiple of a smallest partition of a transmission period.

A still further object of this invention is to provide a slotted paging mode (discontinuous reception) mode of operation of a CDMA radiotelephone, wherein a paging channel slot duration is optimized by being made an integer multiple of a system time pseudonoise (PN) sequence rollover period, and is also made an integer multiple of a paging channel frame period.

Another object of this invention is to provide an efficient method to initialize a Long Code PN generator to a correct state.

The foregoing and other problems are overcome and the objects of the invention are realized by a Code Division Multiple Access (CDMA) radiotelephone system that is constructed an operated in accordance with the invention.

The system includes at least one base station for transmitting a paging channel having a plurality of repeating paging channel slots each of which is comprised four frames.

The system further includes a radiotelephone capable of operation within the CDMA radiotelephone system, the radiotelephone comprising a receiver for receiving the paging channel transmission; a system time pseudonoise (PN) generator; and despreading circuitry, having an input coupled to the receiver, for despreading the paging channel transmission received during at least a portion of the assigned slot. The assigned slot is predetermined to have a duration that is three times the duration of a rollover period of the system time pseudonoise (PN) generator (26.667 msec) and four times the duration of one frame (20 msec), or 80 msec.

Also disclosed is a method for use in a CDMA radiotelephone for initializing a Long Code PN generator. The method includes the steps of (a) determining a multi-bit mask that, when Exclusive-ORed with a current state of a Long Code PN generator, will produce a state that the Long Code PN generator will assume at a predetermined time in the future; (b) storing the mask in a memory of the radiotelephone; and, in response to a requirement to initialize the Long Code PN generator at the predetermined time in the future, (c) accessing the memory to retrieve the mask; and (d) Exclusive-ORing the retrieved mask with a previous state of the Long Code PN generator to obtain a correct current state.

BRIEF DESCRIPTION OF THE DRAWINGS

The above set forth and other features of the invention are made more apparent in the ensuing Detailed Description of the Invention when read in conjunction with the attached Drawings, wherein:

FIG. 1 is diagram that illustrates the relationships between the repetitive PN rollover period and the occurrences of paging channel slots when operating in a DRX mode;

FIG. 2 is a block diagram of a receiver portion of a CDMA radiotelephone that is suitable for use with the optimized slotted paging mode of this invention;

DETAILED DESCRIPTION OF THE INVENTION

Figure 3:
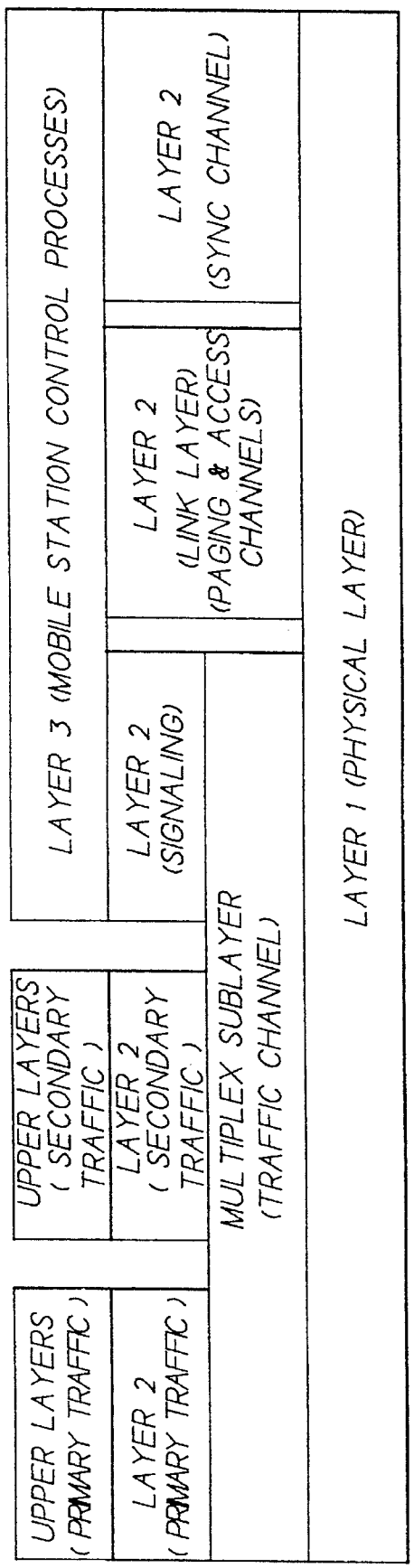
FIG. 3 illustrates a hierarchy of layers and channels in a CDMA cellular communication system, including the paging channel of most interest to the teaching of this invention.

FIG. 1 is a diagram that illustrates the relationships between the repetitive PN rollover period and the occurrences of paging channel slots when operating the radiotelephone of FIG. 2 in a DRX mode. In FIG. 2, the radiotelephone 10 receives a wireless transmission from a base station (BS) 12 through receiver circuitry 30. In the presently preferred embodiment of the invention the radiotelephone 10 and BS 12 form a portion of a Code Division Multiple Access (CDMA) cellular network or system. The radiotelephone 10 includes a processor 14, a timer 16, and a system time, or short code, pseudonoise (PN) generator 18. The processor 14 controls the overall operation of the radiotelephone 10. One function of the timer 16 is to periodically generate an interrupt for interrupting the processor 14 out of a quiescent state into an active state. The system time PN generator 18 is used for loading other PN generators for despreading a received CDMA transmission from the BS 12. The PN generator has a rollover period of 26.667 msec. The rollover period is a function of basic CDMA system timing.

The radiotelephone 10 includes a searcher 20, having an associated searcher PN generator, for acquiring initial synchronization and acquisition of a CDMA transmission. The radiotelephone 10 also has a plurality of correlators or fingers (F1–F3) 22, 24 and 26. A combiner 28 combines the outputs of the fingers as appropriate to obtain a despread signal. The operation of these various components in receiving and despreading the CDMA transmission is conventional, and is not described further herein.

As depicted in FIG. 3, the BS 12 and radiotelephone 10 operate with a plurality of channels, including a Sync Channel, Paging and Access Channels, and Traffic Channels. This invention is most specifically concerned with operation on the Paging Channel.

The Paging Channel is divided into slots called Paging Channel slots. Paging and control messages for a mobile station operating in the non-slotted mode can be received in any of the Paging Channel slots. Therefore, the non-slotted mode of operation requires the mobile station to monitor all slots. However, this mode of operation results in a duty cycle of unity, and is therefor undesirable for battery powered equipment.

The Paging channel protocol also provides for scheduling the transmission of messages for a specific mobile station in certain assigned slots. Support of this feature is optional and may be enabled by each mobile station. A mobile station that monitors the Paging Channel only during certain assigned slots is referred to as operating in the slotted mode. During the slots in which the Paging channel is not being monitored, the mobile station can stop or reduce its processing for power conservation. As presently specified, the mobile station may not be operated in the slotted mode in any state except in a Mobile Station Idle State.

A mobile station operating in the slotted mode generally monitors the Paging Channel for one or two slots per slot cycle. The mobile station can specify its preferred slot cycle using the SLOT_CYCLE_INDEX field in, by example, a Registration Message, Orientation Message, or a Page Response Message.

In accordance with an aspect of this invention, the duration of the paging channel slot is set at 80 msec. This value is selected to be an integer multiple, specifically 3, of the 26.667 msec PN rollover period, and also an integer multiple, specifically 4, of the 20 msec frame period. The use of this value beneficially reduces the overall power consumption, because the repetitively reoccuring paging channel slots are thus synchronized to system time.

The length of the slot cycle, T, in units of 1.28 seconds (16 Slots of 80 msec duration), is given by $T-2^i$, where i is the selected slot cycle index. There are 16×T slots in a slot cycle.

This alignment provides a significant advantage during the operation of the radiotelephone 10. Specifically, if it is known that the short code PN generator 18 is in a particular state at the beginning of a slot (i.e., the zero state), then the state of the PN generator 18 can be readily determined N milliseconds before the start of the next slot. Preferably, the processor 14 is re-activated at the same point (e.g., point B in FIG. 1) before the beginning of the next paging channel slot. As a result, the state of the PN generator 18 need be determined but once and stored, for example, in a memory 14A. The processor 14 is thus not required to repetitively perform this calculation. Upon the processor 14 being reactivated, the stored short code PN state can be directly loaded into the system time PN generator 18.

SLOT_NUM is the Paging Channel slot number, modulo the maximum length slot cycle (2048 slots). That is, the value of SLOT_NUM is SLOT_NUM=|t/4| mod 2048, where t is the System Time in frames. For each mobile station, the starting times of its slot cycles are offset from the slot in which SLOT_NUM equals zero by a fixed, randomly selected number of slots as specified.

As an example, for a slot cycle length of 1.28 seconds wherein the computed value of PGSLOT is equal to 6, one of the mobile station's slot cycles begins when SLOT_NUM equals 6. The mobile station begins monitoring the Paging Channel at the start of the slot in which SLOT_NUM equals 6. The next slot in which the mobile station must begin monitoring the Paging Channel is 16 slots later, i.e., the slot in which SLOT_NUM is 22.

Slotted Page Messages contain a field called MORE_PAGES which, when set to 'O' during a mobile station's assigned slot, indicates that the remainder of the slot will contain no more messages addressed to that mobile station. This allows a mobile station operating in the slotted mode to stop monitoring the Paging Channel as soon as possible.

If no Slotted Page Message containing the MORE_PAGES field equal to 'O' is received in the assigned slot, the mobile station continues to monitor the Paging Channel for one additional slot. This allows the base station 12 to carry over a message begun in the assigned slot into the following slot, if necessary.

In accordance with an aspect of this invention, when operating in the slotted mode the mobile station 10 receives at least one frame of the paging channel slot (FIG. 1). If there is no message directed to the mobile station 10, the mobile station places itself into a low power mode at point A. This involves powering down selected portions of the circuitry, such as the system time PN generator 18 and the receiver 30 of FIG. 2. After setting the selected circuits into a low power mode, the processor 14 programs the timer 16 to generate an interrupt at a future time (point B), and may then enter a low power mode of operation itself.

As was described previously, there exists a certain amount of overhead to receive a slotted page message. Because of the continuous convolutional coding on the CDMA Paging Channel, the mobile station 10 may have to receive at least a frame before and after the Paging Channel slot, depending on the paging channel data rate. This time, in conjunction with various turn-on times in the receiver circuitry 30, results in a typical overhead of approximately 100 ms.

Point B is thus selected to be prior to the start of the next assigned Paging Channel slot. In particular, point B is selected so that the processor 14 will have sufficient time to power up the previously powered down circuitry so that the circuitry will have sufficient time to settle. In addition, the searcher 20 requires sufficient time to reacquire the transmitted signal so that a message can be received therefrom. In a presently preferred embodiment of the invention the point B is selected to be equal to or less than approximately 100 msec before the start of the next paging channel slot. This figure has been found to insure that the mobile station 10 will have sufficient time to reacquire the paging channel without excessively increasing the duty cycle. It is noted that the actual position of point B with respect to the beginning of the next paging channel slot may vary widely between embodiments and implementations, and is a function at least in part of the processor speed, the time required to settle the analog circuitry, etc.

In that the duration of time between point A and point B is known a priori, and as was previously described, it is possible to predetermine the correct state of the system time PN generator 18 at point B. This value is stored in the memory 14A, for example at the factory, and is used by the processor 14 at point B to reinitialize the system time PN generator 18, the searcher PN generator 20A, and the PN generators (not shown) associated with each of the fingers 22–26 to the correct state. As a result, all PN generators can be placed in a low power mode of operation between points A and B, and correctly initialized when reactivated.

It is also within the scope of the invention to employ a predetermined mask that, when Exclusive-ORed with the content of the system time PN generator 18, yields the correct state of the PN generator 18 at a predetermined time in the future (point B). The mask is stored in the memory 14A for use by the processor 14 in initializing the system time PN generator, and thence the searcher and finger PN generators, to the correct state at point B.

The use of the mask to determine a correct future state of a PN generator is extended also to the initialization of the Long Code PN generator 32. As was previously described, the Long Code is a PN sequence with a period of $2^{42}-1$ that is used for scrambling on the Forward (base station to mobile) CDMA Channel and for spreading on the Reverse (mobile to base station) CDMA Channel. The Long Code uniquely identifies a mobile station on both the Forward and Reverse Traffic Channels. The Long Code also serves to provide limited privacy, and separates multiple Access Channels on the same CDMA channel. A Long Code Mask is a 42 bit binary number that creates the unique identity of the Long Code.

Figure 4:
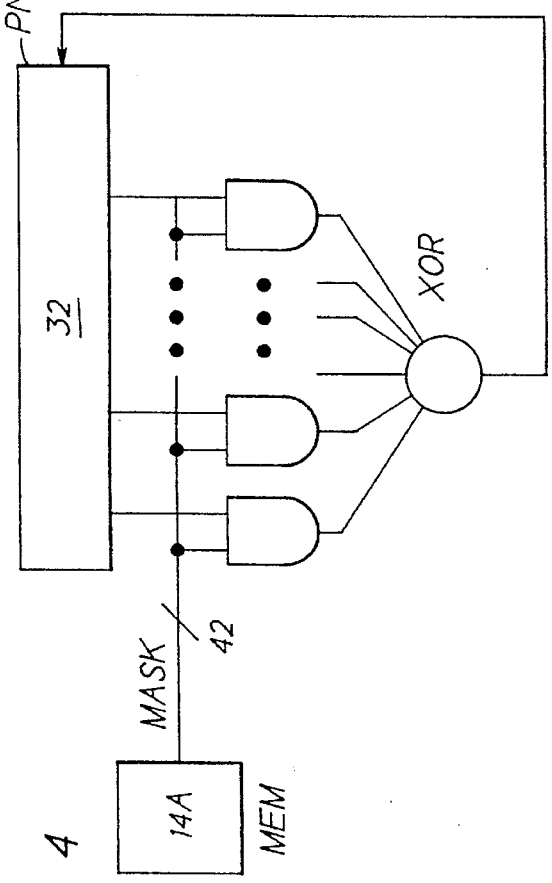
FIG. 4 illustrates a Long Code PN generator and circuitry for initializing same with a predetermined mask.

As is seen in more detail in FIG. 4, the Long Code PN generator 32 is provided with a predetermined mask, in accordance with the invention, which is applied through gates 34 at the output of the Long Code PN generator 32. The mask, when XORed (36) with current state of the Long Code PN generator, enables the state of the Long Code PN generator to be advanced to a desired point (specifically point B in FIG. 1).

It is noted that over a period of approximately two seconds the drift in timing is small and, as a result, only a small number of Long Code masks are required to be stored. If this were not the case, then potentially $2^{42}$ 42-bit masks would be required to be stored, which would be impractical, and the matrix multiply would be required. In accordance with an aspect of the invention, the Long Code masks are precalculated and stored within the memory 14A and, during the life of the radiotelephone 10, are not required to be calculated by the processor 14.

The same technique of XORing a predetermined mask with the state of the system time PN generator 18 enables the system time PN generator to also be advanced to a desired future point.

Figure 5A:
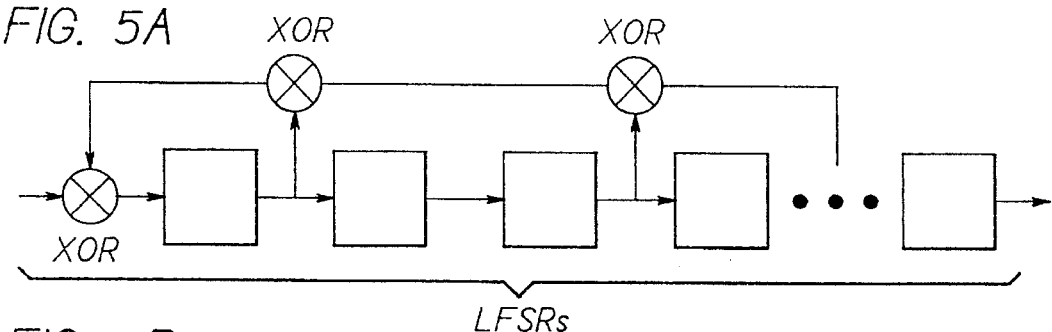
FIGS. 5A and 5B each depict an embodiment of a Linear Feedback Shift Register (LFSR)
Figure 5B:
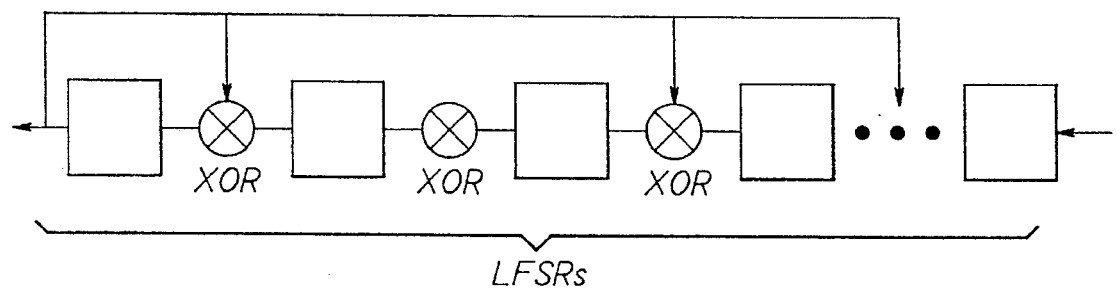
Figure 6:
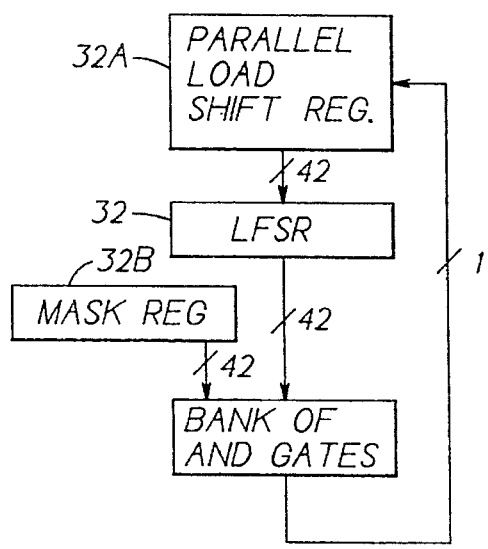
FIG. 6 is a block diagram that illustrates the Long Code PN generator in greater detail.

FIGS. 5A and 5B illustrate the use of linear feedback shift registers (LFSRs) to implement a PN generator, such as the Long Code PN generator 32. Using the LFSR configuration in FIG. 5A, it is possible to apply a mask, as depicted in FIG. 4, and feed the data back in on itself to create a new state in the future. In practice, and as is shown in FIG. 6, the mask is stored in a mask register 32B and the data is fed into a second register 32A, which is then loaded in parallel into the actual LFSR generator 32. This technique prevents the corruption of the shifting process while the masking process is occurring. It has been found that the state of the LFSR shown in FIG. 5B is the appropriate mask for the LFSR in FIG. 6, and is thus employed for pre-calculating the masks.

Figure 7:
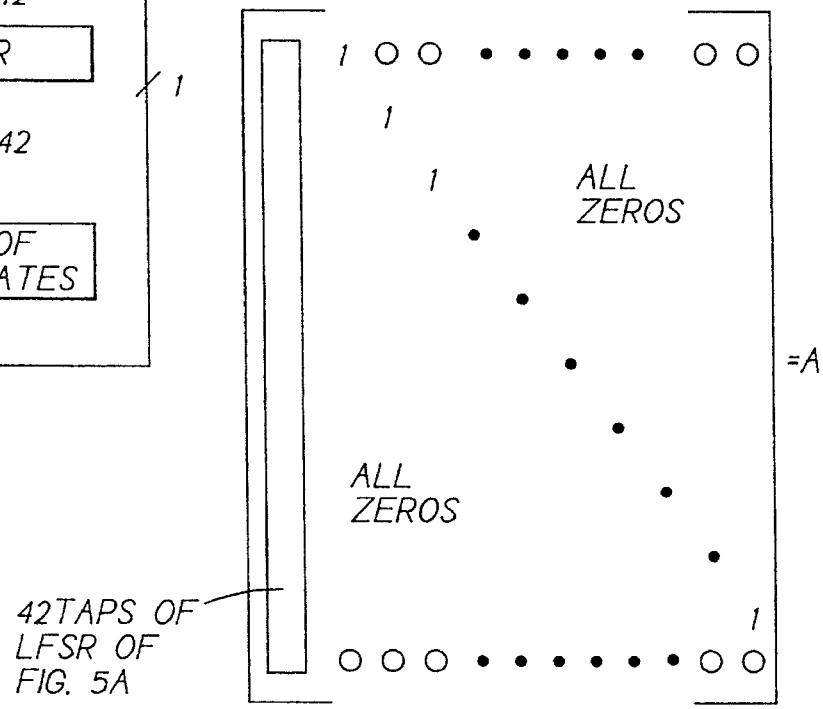
FIG. 7 illustrates a method of determining a Long Code mask for the LFSR of FIG. 5A.

To accomplish the matrix multiply, and referring to FIG. 7, a 42×42 matrix is constructed with the taps of the LFSR shown in FIG. 5A. If this matrix is designated matrix A, then multiplying A by the state of the PN generator of FIG. 5A gives the stake at offset 1, multiplying by $A^2$ gives the state at offset 2, multiplying by $A^4$ gives the state at offset 4, etc. In this fashion the matrix multiply operation would be performed in order to generate the Long Code masks for storage within the memory 14A.

While the invention has been particularly shown and described with respect to preferred embodiments thereof, it will be understood by those skilled in the art that changes in form and details may be made therein without departing from the scope and spirit of the invention.

What is claimed is:

1. A direct sequence, spread spectrum Code Division Multiple Access (CDMA) radiotelephone system, comprising:

a plurality of base stations each having a base station coverage area, each of said plurality of base stations transmitting a paging channel having a plurality of repeating paging channel slots each of which is comprised X frames, each of said plurality of base stations including means for assigning at least one paging channel slot to radiotelephones located within the coverage area of the base station; and individual ones of said radiotelephones comprising control means for operating said radiotelephone within the CDMA radiotelephone system, an individual one of said radiotelephones comprising, a receiver for receiving the paging channel transmission from at least one of said plurality of base stations;

a system time pseudonoise (PN) generator means;

a multi-finger correlator, having an input coupled to said receiver, for despreading a paging channel transmission received during at least a portion of an assigned paging channel slot, wherein the assigned paging channel slot is predetermined to have a duration that is Y times the duration of a rollover period of said system time pseudonoise (PN) generator; and means for periodically activating at least portions of said radiotelephone to receive and despread a paging channel transmission received during at least the portion of the assigned paging channel slot.

2. A direct sequence, spread spectrum CDMA radiotelephone system as set forth in claim 1, wherein X is equal to four, and wherein Y is equal to three.

3. A method for use in a direct sequence, spread spectrum, CDMA radiotelephone for initializing a multi-bit pseudonoise (PN) generator, comprising the steps of:

determining a multi-bit mask that, when logically combined with a first state of the PN generator, produces a second state that the PN generator will assume after a predetermined interval of time;

storing the determined multi-bit mask in a memory of the radiotelephone;

placing the radiotelephone into a quiescent state for the predetermined interval of time;

in response to a subsequent transition of the radiotelephone from the quiescent state to an operational state after an expiration of the predetermined interval of time, and prior to despreading a transmission received during at least a portion of a slot, wherein the slot is comprised of four frames and has a duration that is three times the duration of a predetermined system time period, accessing the memory to retrieve the stored multi-bit mask;

logically combining the retrieved mask with the first state of the PN generator to generate a bit stream; and storing the bit stream into the PN generator as the second state of the PN generator.

4. A method for use in a direct sequence, spread spectrum, CDMA radiotelephone for initializing a multi-bit pseudonoise (PN) generator, the radiotelephone being of a type that is periodically placed into a powered down state, comprising the steps of:

determining a multi-bit mask that, when logically combined with a first state of the PN generator, produces a second state that the PN generator will assume after a predetermined interval of time; and storing the determined multi-bit mask in a memory of the radiotelephone;

thereafter, after each occurrence of placing the radiotelephone into the powered down state for the predetermined interval of time, and in response to a transition of the radiotelephone from the powered down state to a powered state and prior to despreading a transmission received during at least a portion of an assigned paging channel slot, wherein the assigned paging channel slot is comprised of four frames and has a duration that is three times the duration of a predetermined system time period, accessing the memory to retrieve the stored multi-bit mask;

logically combining the retrieved mask with the first state of the PN generator to generate a bit stream; and storing the bit stream into the PN generator as the second state of the PN generator.

\* \* \* \* \*